(12) United States Patent
Hong et al.

(10) Patent No.: US 10,741,823 B2
(45) Date of Patent: Aug. 11, 2020

(54) SYSTEM AND METHOD FOR INJECTING ELECTROLYTE OF POUCH TYPE BATTERY

(71) Applicant: LG Chem, Ltd., Seoul (KR)

(72) Inventors: Suk-Hyun Hong, Daejeon (KR);
Myung-Hyun Kim, Daejeon (KR);
Hyo-Jin Park, Daejeon (KR);
Joon-Sung Bae, Daejeon (KR);
Eui-Kyung Lee, Daejeon (KR);
Jin-Woo Heo, Daejeon (KR)

(73) Assignee: LG Chem, Ltd. (KR)

( * ) Notice: Subject to any disclaimer, the term of this patent is extended or adjusted under 35 U.S.C. 154(b) by 187 days.

(21) Appl. No.: 15/804,269

(22) Filed: Nov. 6, 2017

(65) Prior Publication Data

US 2018/0175364 A1  Jun. 21, 2018

(30) Foreign Application Priority Data

Dec. 20, 2016 (KR) .................... 10-2016-0174832

(51) Int. Cl.
| | |
|---|---|
| *H01M 2/36* | (2006.01) |
| *H01M 10/0525* | (2010.01) |
| *H01M 10/058* | (2010.01) |
| *H01M 10/04* | (2006.01) |
| *H01M 4/04* | (2006.01) |

(52) U.S. Cl.
CPC .............. *H01M 2/362* (2013.01); *H01M 2/36* (2013.01); *H01M 10/049* (2013.01); *H01M 10/058* (2013.01); *H01M 4/0445* (2013.01); *H01M 10/0525* (2013.01); *H01M 2220/20* (2013.01)

(58) Field of Classification Search
CPC .... H01M 2/1241; H01M 2/0275; H01M 2/36; H01M 2/362
See application file for complete search history.

(56) References Cited

U.S. PATENT DOCUMENTS

| | | | | |
|---|---|---|---|---|
| 3,865,631 | A * | 2/1975 | Clayman ................. | H01M 6/38 429/52 |
| 2007/0154803 | A1* | 7/2007 | Kim ...................... | H01M 2/021 429/185 |
| 2009/0253038 | A1* | 10/2009 | Segawa ............... | H01M 10/044 429/210 |
| 2010/0028772 | A1* | 2/2010 | Yang ..................... | H01M 2/021 429/185 |

(Continued)

FOREIGN PATENT DOCUMENTS

| | | |
|---|---|---|
| JP | 2010-102928 A | 5/2010 |
| JP | 5151755 B2 | 2/2013 |

(Continued)

*Primary Examiner* — Imran Akram
(74) *Attorney, Agent, or Firm* — Lerner, David, Littenberg, Krumholz & Mentlik, LLP (57) ABSTRACT

A method for injecting an electrolyte of a pouch type battery is provided. The method includes pressing the pouch type battery that has a gas pocket on a first side thereof to move gas generated from the battery toward the gas pocket. The gas pocket is then pierced using a needle type injector and an electrolyte is injected through the pierced portion. The electrolyte injected into the gas pocket is moved toward a second side of the battery and the gas pocket is pierced to remove the gas under a vacuum and seal the battery.

10 Claims, 7 Drawing Sheets

(56) References Cited

U.S. PATENT DOCUMENTS

| | | | |
|---|---|---|---|
| 2011/0091752 A1* | 4/2011 | Kim | H01M 2/0443 429/72 |
| 2011/0129702 A1* | 6/2011 | Ahn | H01M 2/0207 429/53 |
| 2013/0244093 A1 | 9/2013 | Min et al. | |
| 2015/0086817 A1* | 3/2015 | Chung | H01M 2/1241 429/56 |
| 2015/0270530 A1* | 9/2015 | Thoennessen | H01M 2/362 29/623.2 |
| 2015/0372341 A1* | 12/2015 | Chen | H01M 10/0481 29/623.2 |
| 2017/0125787 A1* | 5/2017 | Ryu | H01M 2/365 |

FOREIGN PATENT DOCUMENTS

| | | |
|---|---|---|
| KR | 10-2012-0060707 A | 6/2012 |
| KR | 101254799 B1 | 4/2013 |
| KR | 10-1517062 B1 | 4/2015 |
| KR | 10-2016-0076608 A | 7/2016 |

\* cited by examiner

SYSTEM AND METHOD FOR INJECTING ELECTROLYTE OF POUCH TYPE BATTERY

CROSS-REFERENCE TO RELATED APPLICATION

The present application claims the benefit of Korean Patent Application No. 10-2016-0174832 filed on Dec. 20, 2016, the disclosure of which is incorporated herein by reference in its entirety.

TECHNICAL BACKGROUND

The present disclosure relates to a method for injecting an electrolyte of a pouch type battery, and more particularly, to a method for injecting an electrolyte of a pouch type battery, including piercing a gas pocket to trap gas generated from the inside of the battery using a needle-type injector and injecting an electrolyte through the pierced portion.

RELATED ART

Due to the high applicability to various products and electrical properties such as a high energy density, secondary batteries are commonly applied to portable devices, and also, universally applied to electric vehicle (EV) or hybrid vehicle (HV) driven using an electric driving source. Secondary batteries are gaining attention for their primary advantage of remarkably reducing the use of fossil fuels and minimizing the generation of by-products from the use of energy, making them a new eco-friendly and energy efficient source of energy.

A secondary battery refers to a device that produces electricity by electrochemical reaction of a positive electrode and a negative electrode. Secondary batteries may be classified into a stack-type structure, a winding-type (jelly-roll-type) structure, and a stack/folding-type structure according to the structure of an electrode assembly.

Meanwhile, the secondary battery is manufactured through an assembly process to embed the electrode assembly in a battery case together with an electrolyte and an additive, and an activation process. The activation process stabilizes the battery structure and places the assembled battery into a usable state through charging, aging and discharging of the battery. In the activation process, the electrolyte and the additive are subjected to decomposition reaction during initial charging, to form a solid electrolyte interface (SEI) on the electrode surface.

Unless the electrolyte or the additive consumed during initial charging is replenished, the battery performance degrades, and accordingly, an additional process for replenishing electrolytes or additives is required. Therefore, there is a need for a process for replenishing electrolytes or additives in a simplified manner.

SUMMARY

The present disclosure provides a method for injecting an electrolyte of a pouch type battery with a simplified process for replenishing electrolytes or additives in the battery. Other objects and advantages of the present disclosure will be understood by the following description, and will be apparent from the embodiments of the present disclosure. Furthermore, it will be easily understood that the objects and advantages of the present disclosure may be realized by the means defined in the appended claims and its combination.

To achieve the object, a method for injecting an electrolyte of a pouch type battery according to an aspect of the present disclosure may include (S1) pressing a pouch type battery having a gas pocket on a first side thereof to move gas generated from the battery toward the gas pocket, (S2) piercing the gas pocket using a needle type injector, and injecting an electrolyte through the pierced portion, (S3) moving the electrolyte injected into the gas pocket toward a second side of the battery, and (S4) piercing the gas pocket to remove the gas under a vacuum, and sealing the battery.

In particular, the pouch type battery may be a pouch type battery having undergone an activation process. In this instance, the gas generated may be gas generated during the activation process of the pouch type battery. Furthermore, the electrolyte injected through the pierced portion may replenish electrolyte components consumed in the activation process. Meanwhile, each step may be performed on the pouch type battery placed in a vertical direction with respect to the bottom.

Each step may also be performed on the pouch type battery placed in a horizontal direction with respect to the bottom. In particular, the moving of the electrolyte may include releasing the pressing of the pouch type battery, tilting the battery at a predetermined angle of inclination between the battery and the bottom to move the electrolyte toward the second side of the battery, and returning the battery to an original state to place the battery in a horizontal direction with respect to bottom.

The predetermined angle of inclination may be an angle of about 10° or greater between the battery and the bottom. Meanwhile, the battery may be a lithium secondary battery. According to an aspect of the present disclosure, electrolytes and additives consumed during an activation process of battery may be replenished during the performing of a degassing process. Further, an electrolyte may be injected using a needle-type injector by piercing a gas pocket without cutting a pouch, leading to a simplified electrolyte injection process. Additionally, additional electrolytes may be replenished after an activation process of battery, to select the type of electrolyte and additive to allow battery reaction desired by a user to take place in each step before and after the activation process. Further, additionally injected electrolytes or additives affect a solid electrolyte interface (SEI) structure, which is advantageous in improving the battery performance.

BRIEF DESCRIPTION OF THE DRAWINGS

The accompanying drawings illustrate exemplary embodiments of the present disclosure and, together with the foregoing disclosure, serve to provide further understanding of the technical aspect of the present disclosure. However, the present disclosure is not to be construed as being limited to the drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the exemplary embodiments described in the specification and illustration in the drawings are just an example of the present disclosure, and do not represent the technical aspects of the present disclosure fully, so it should be understood that other equivalents and variations could be made thereto at the time of filing a patent application. Furthermore, in describing the present disclosure, when a detailed description of relevant known configuration or functionality is deemed to render the subject matter of the present disclosure ambiguous, the detailed description is omitted herein. The exemplary embodiments of the present disclosure are provided to describe the invention to those skilled in the art more completely, and the shape and size of elements in the drawings may be exaggerated for clarity.

A battery such as a secondary battery is generally manufactured by the following process. For reference, the following description is subject to change depending on the type of battery. First, a process for manufacturing an electrode assembly is performed. The electrode assembly has a structure in which a positive electrode and a negative electrode face each other with a separator disposed therebetween. The electrode assembly may be classified into a stack-type, a winding-type (jellyroll-type), and a stack/folding-type according to the structure.

In the stack-type structure, a positive electrode, a separator, and a negative electrode are cut into a predetermined size and stacked in a sequential order to form an electrode assembly. In this instance, the separator is disposed at each location between the positive electrode and the negative electrode. In the winding-type structure, after a positive electrode, a separator, a negative electrode, and another separator are formed in sheet form, they are stacked in a sequential order and wound to form an electrode assembly. In the stack/folding-type structure, a full-cell or bi-cell is formed and wound through a separator sheet to form an electrode assembly. The full-cell or bi-cell is formed by cutting a positive electrode, a separator, and a negative electrode into a predetermined size and stacking in a sequential order. In this instance, the full-cell or the bi-cell each includes at least one positive electrode, at least one separator, and at least one negative electrode.

A method for manufacturing the electrode assembly slightly differs depending on the aforementioned structure. Subsequently, a process for receiving the electrode assembly in a battery case is performed. The battery case in which the electrode assembly is received may be classified into a cylindrical type, a prismatic type, a coin type, and a pouch type according to the shape. A method for receiving the electrode assembly in the battery case differs depending on the shape of the battery case.

A process for injecting electrolyte and additive into the battery case is then performed. The additive is used to reduce gas, reduce the resistance, and improve the low-temperature performance during cycles of the battery. Subsequently, an activation process involving charging, aging and discharging of the battery, a degassing process, and a sealing process are performed.

Hereinafter, referring to FIGS. 1 to 7, a method for injecting an electrolyte of a pouch type battery according to the present disclosure is performed through each step as below. First, a pouch type battery 10 having a gas pocket 11 formed on a first side of the battery may be pressed to move gas generated from the battery toward the gas pocket (S1). In particular, the pouch type battery 10 may be an activated battery and the generated gas may be gas generated during the activation process. When the activation process of the battery is performed, the electrolyte and the additive included in the battery are subjected to decomposition reaction, forming a solid electrolyte interface (SEI) on the electrode surface, and at the same time, gas is generated by the decomposition reaction. When the gas remains in the battery, the gas may adversely affect the battery performance, and thus, the gas needs to be removed during the degassing process.

Further, the gas pocket 11 may be pierced using a needle-type injector 12, and an electrolyte 13 may be injected through the pierced portion (S2). In particular, as done in the step S1, the pouch type battery 10 may be pressed continuously. To inject or replenish electrolytes, generally, the battery case or pouch is cut and electrolytes are injected. However in the present disclosure, the electrolyte may be injected using the needle-type injector 12 by piercing the gas pocket 11 without cutting the pouch itself, and accordingly, the electrolyte 13 may be injected in a simplified manner.

The injected electrolyte may replenish the electrolyte consumed in the activation process of the battery and the additive added to the electrolyte. Accordingly, an advantage is that the type of the electrolyte or additive may be selected and adjusted to allow reaction desired by a user to occur in the battery at each step before and after the activation process of the battery. Subsequently, the electrolyte 13 injected into the gas pocket 11 may be moved toward a second side of the battery (S3). In particular, as performed in the step S1, the pouch type battery 10 may be pressed continuously.

Accordingly, the electrolyte 13 injected into the gas pocket 11 may be impregnated uniformly into the electrode assembly. Subsequently, the gas may be removed under a vacuum by piercing the gas pocket 11, followed by sealing of the battery (S4). Accordingly, it may be possible to prevent air from entering the battery from the outside. In this instance, as performed in the step S1, the pouch type battery 10 may be pressed continuously.

Figure 1:
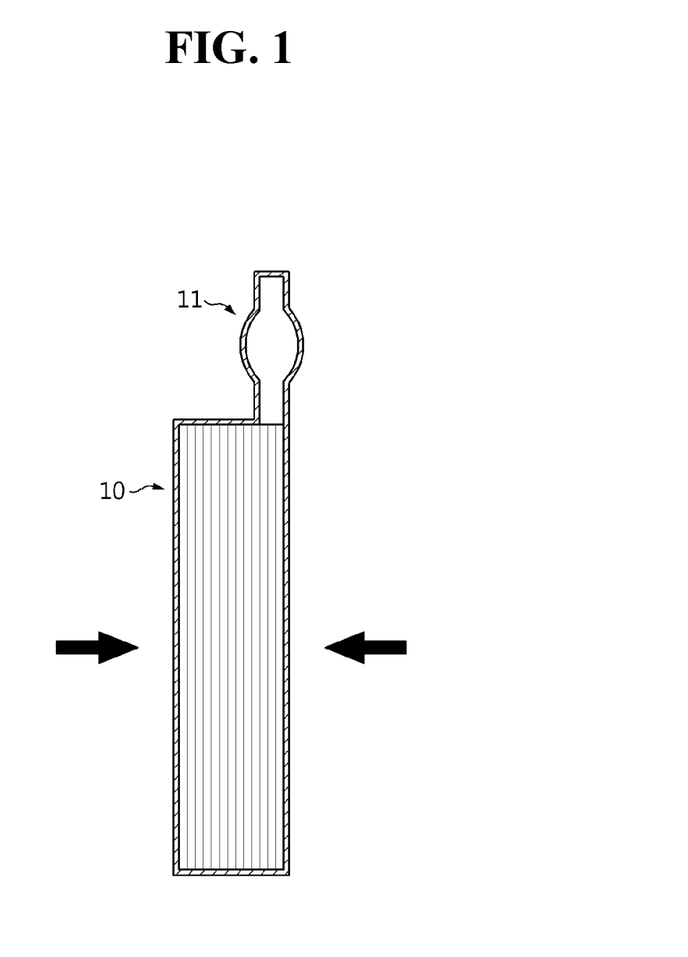
FIGS. 1 to 3 are diagrams sequentially showing a method for injecting an electrolyte according to an exemplary embodiment of the present disclosure.
Figure 2:
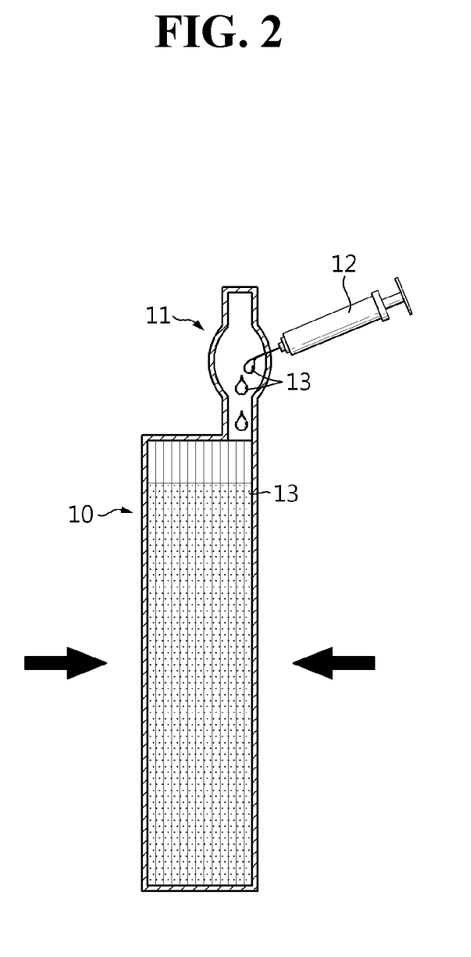
Figure 3:
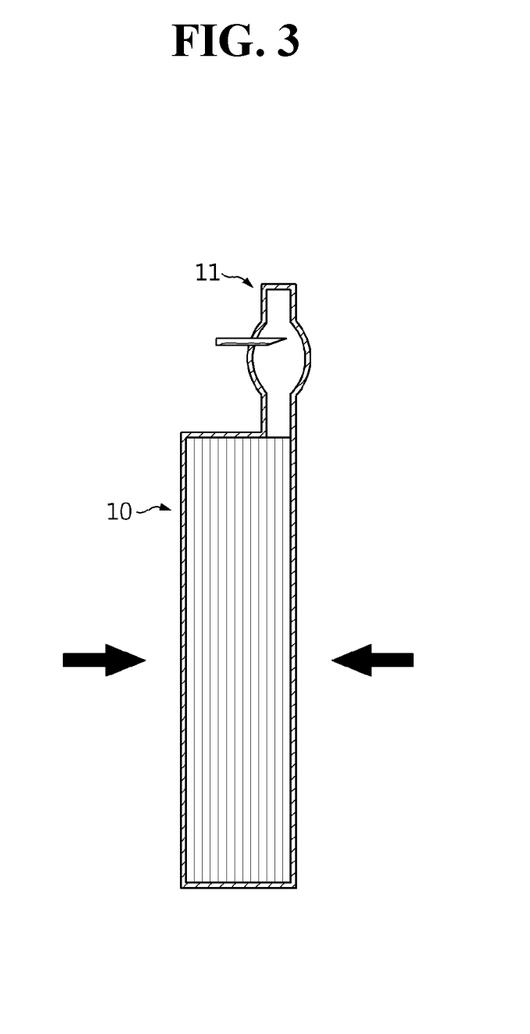
Figure 4:
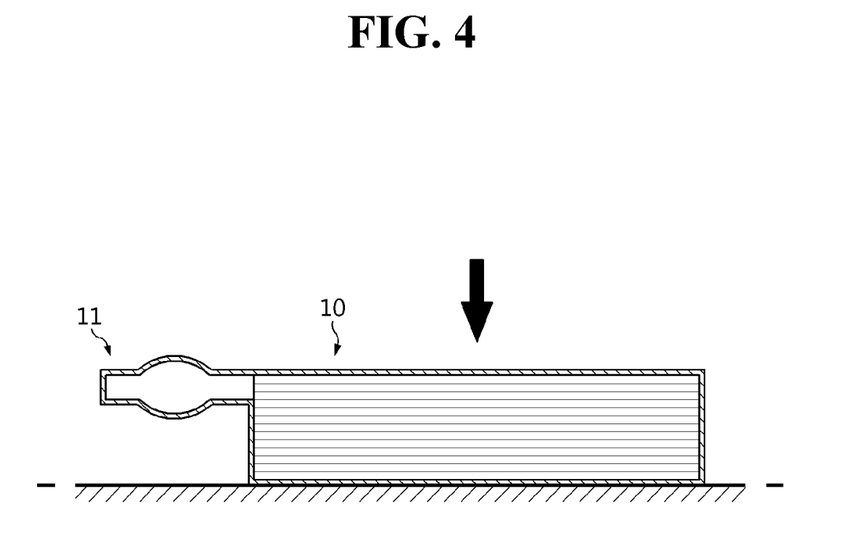
FIGS. 4 to 7 are diagrams sequentially showing a method for injecting an electrolyte according to another exemplary embodiment of the present disclosure.
Figure 5:
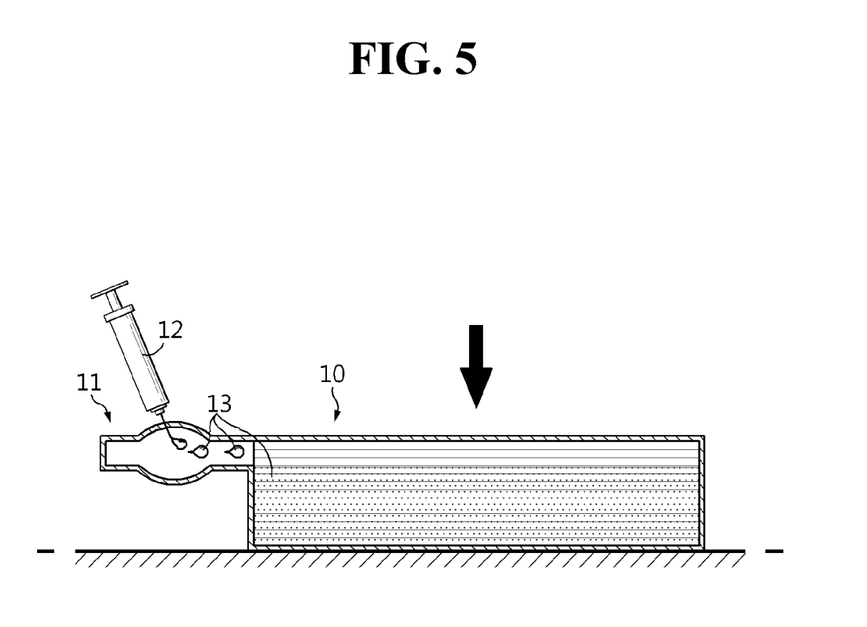
Figure 6:
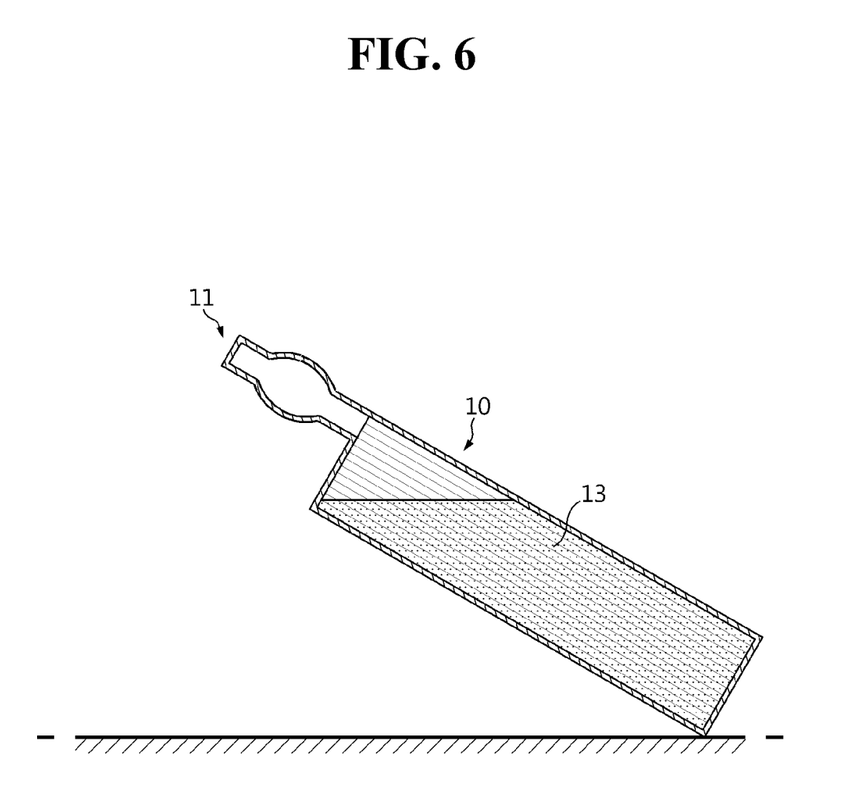
Figure 7:
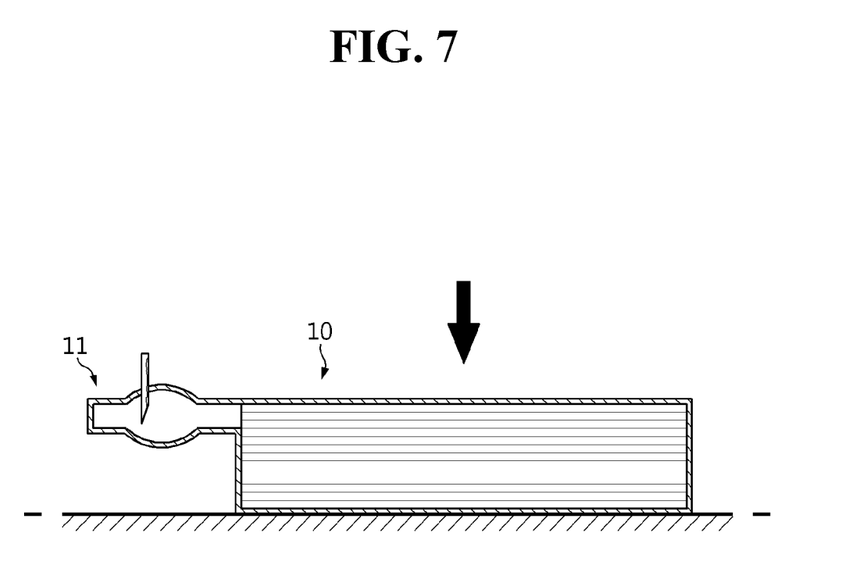

Meanwhile, each step may be performed on the battery placed in a vertical direction with respect to the bottom, that is, a first side of the battery where the gas pocket facing upward and a second side of the battery facing downward (see FIGS. 1 to 3). Furthermore, each step may be performed on the battery placed in a horizontal direction with respect to the bottom (see FIGS. 4 to 7).

In the process of moving the electrolyte injected into the gas pocket toward a second side of the battery may further include releasing the pressing acting on the pouch type battery 10, tilting the battery at a predetermined angle of inclination between the battery and the bottom to move the electrolyte toward the second side of the battery, and returning the battery to an original state to dispose the battery in the horizontal direction with respect to the bottom. Subsequently, the pouch type battery 10 may be pressed again. In particular, the predetermined angle of inclination may be an angle of about 10° or greater between the battery and the bottom, and at this angle of inclination, the electrode assembly in the battery may be fully impregnated with the replenished electrolytes or additives.

Meanwhile, the battery of the present disclosure may include all devices in which electrochemical reaction occurs, and specific examples include all types of primary batteries, secondary batteries, fuel cells or capacitors including supercapacitors. Particularly, among these secondary batteries, lithium secondary batteries including lithium metal secondary batteries, lithium ion secondary batteries, lithium polymer secondary batteries or lithium ion polymer secondary batteries are preferable.

There is no limitation on the electrode used in the present disclosure, and the electrode may be manufactured by binding an electrode active material to an electrode current collector according to common methods known in the art. Of the electrode active material, non-limiting examples of the positive electrode active material include general positive electrode active materials commonly used in positive electrode of electrochemical devices, and especially, lithium manganese oxide, lithium cobalt oxide, lithium nickel oxide, lithium iron oxide or lithium composite oxide thereof. Non-limiting examples of the negative electrode active material include general negative electrode active materials commonly used in negative electrode of electrochemical devices, and especially, lithium intercalation materials such as lithium metal or lithium alloy, carbon, petroleum coke, activated carbon, graphite or other carbon materials are preferable. Non-limiting examples of the positive electrode current collector include foils made of aluminum, nickel or their combination, and non-limiting examples of the negative electrode current collector include foils made of copper, gold, nickel or copper alloy or their combination.

An electrolyte salt included in an electrolyte usable in the present disclosure is a lithium salt. The lithium salt includes those commonly used in electrolytes for lithium secondary batteries without limitation. For example, an anion of the lithium salt may be any one selected form the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$. An organic solvent included in the non-aqueous electrolyte includes those commonly used in electrolytes for lithium secondary batteries without limitation, and for example, ether, ester, amide, linear carbonate, and cyclic carbonate, used singly or in combination.

Among them, the organic solvent typically includes cyclic carbonate, linear carbonate, or carbonate compounds thereof. Meanwhile, a battery case used in the present disclosure is not limited to a particular type, but includes a cylindrical type and a prismatic type using a can, a pouch type or a coin type, and a pouch type battery case is the most preferable.

While the technical aspects of the present disclosure have been hereinabove described for illustration, it is obvious to those skilled in the art that various modifications and changes may be made thereto without departing from the essential features of the present disclosure. Accordingly, the exemplary embodiments disclosed herein are not intended to limit the technical aspects of the present disclosure and the scope of technical aspects of the present disclosure is not limited by these exemplary embodiments. The scope of protection of the present disclosure shall be construed by the appended claims and all the technical aspects within the equivalent range thereto shall be construed as being included in the scope of protection of the present disclosure.

What is claimed is:

1. A method for injecting an electrolyte of a pouch type battery comprising:
   providing a pouch type battery comprising a pouch, a gas pocket on a first side of the pouch, an electrode assembly disposed within the pouch and an electrolyte within the pouch;
   pressing the pouch type battery to move gas generated within the battery toward the gas pocket;
   inserting a needle type injector into the gas pocket by piercing the pouch type battery with the needle type injector;
   injecting an electrolyte into the gas pocket with the needle type injector;
   moving the electrolyte injected into the gas pocket toward a second side of the battery; and
   piercing the gas pocket to remove the gas under a vacuum, and sealing the battery.

2. The method for injecting an electrolyte of a pouch type battery according to claim 1, wherein the pouch type battery has undergone an activation process.

3. The method for injecting an electrolyte of a pouch type battery according to claim 2, wherein the gas is generated during the activation process of the pouch type battery.

4. The method for injecting an electrolyte of a pouch type battery according to claim 2, wherein the electrolyte injected in the injecting step replenishes electrolyte components consumed in the activation process.

5. The method for injecting an electrolyte of a pouch type battery according to claim 1, wherein the pouch type battery is placed in a vertical direction with respect to a bottom surface that is horizontally arranged.

6. The method for injecting an electrolyte of a pouch type battery according to claim 1, wherein the pouch type battery is placed in a horizontal direction with respect to a bottom surface that is horizontally arranged.

7. The method for injecting an electrolyte of a pouch type battery according to claim 6, further comprising:

releasing the pressing the battery;

tilting the battery at a predetermined angle of inclination between the battery and the bottom to move the electrolyte toward the second side of the battery; and returning the battery to an original state to dispose the battery in a horizontal direction with respect to the bottom surface.

8. The method for injecting an electrolyte of a pouch type battery according to claim 7, wherein the predetermined angle of inclination is an angle of about 10° or greater between the battery and the bottom surface.

9. The method for injecting an electrolyte of a pouch type battery according to claim 1, wherein the battery is a lithium secondary battery.

10. A method for injecting an electrolyte of a battery comprising:

providing a battery comprising a battery case, a gas pocket disposed on a first side of the battery case, an electrode assembly disposed within the battery case and an electrolyte within the battery case;

activating the battery through charging, aging, and discharging;

pressing the battery to move gas generated within the battery during the activating step toward the gas pocket;

inserting a needle type injector into the gas pocket by piercing the battery with the needle type injector;

injecting the electrolyte into the gas pocket with the needle type injector;

moving the electrolyte injected into the gas pocket toward a second side of the battery; and piercing the gas pocket to remove the gas under a vacuum, and sealing the battery.

* * * * *